United States Patent [19]

Marques

[11] Patent Number: 5,177,408
[45] Date of Patent: Jan. 5, 1993

[54] STARTUP CIRCUIT FOR ELECTRONIC BALLASTS FOR INSTANT-START LAMPS

[75] Inventor: Antonio Marques, Fort Wayne, Ind.

[73] Assignee: MagneTek Triad, Huntington, Ind.

[21] Appl. No.: 732,829

[22] Filed: Jul. 19, 1991

[51] Int. Cl.⁵ .......................................... H05B 37/02
[52] U.S. Cl. ................................... 315/291; 315/360; 363/49
[58] Field of Search ......... 315/291, 307, 360, DIG. 5, 315/DIG. 7, 224, 119, 127; 363/37, 49; 323/266, 901

[56] References Cited

U.S. PATENT DOCUMENTS

| | | | |
|---|---|---|---|
| 4,104,715 | 8/1978 | Lawson | 315/DIG. 5 |
| 5,043,635 | 8/1991 | Talbott | 315/291 |
| 5,068,570 | 11/1991 | Oda | 315/128 |
| 5,068,578 | 11/1991 | Wegener | 315/307 |

Primary Examiner—Eugene R. LaRoche
Assistant Examiner—A. Zarabian
Attorney, Agent, or Firm—Faegre & Benson

[57] ABSTRACT

A start-up delay circuit for an electronic ballast for "instant-start" type fluorescent lamps of the type having an electronic converter powered by an active electronic preregulator. The converter is an inductive-capacitive parallel-resonant push-pull circuit or other type of current-fed power-resonant circuit. The preregulator may be a boost-type. The start-up circuit may be either a resistor and zener diode or resistor, capacitor and diac network or programmable unijunction transistor circuit connected between the preregulator output and an oscillation-enabling input of the converter.

8 Claims, 2 Drawing Sheets 5,177,408

1

STARTUP CIRCUIT FOR ELECTRONIC BALLASTS FOR INSTANT-START LAMPS

BACKGROUND OF THE INVENTION

In the past, there have been a number of efforts to improve the performance of ballasts for fluorescent lamps. One direction such efforts have taken is to utilize electronic ballasts of the type having an input section for power factor and harmonic correction and an output section operating as a current-fed power resonant converter. Active preregulator circuits have been used to accomplish very high power factor and harmonic correction in such input sections. At the same time, the instant-start type of fluorescent lamps continue to be extremely popular, calling for ballasts which are compatible with instant-start lamps.

The use of active preregulators in instant-start applications has led to startup problems in that the integrated circuits used in such active preregulators take appreciable time to attain steady state operating conditions during start-up and can present undesirable operating conditions to the fluorescent lamps when passed through the converter section during start-up transient conditions. For example, one integrated circuit useful in active preregulators typically takes 100 milliseconds up to 500 or 1,000 milliseconds to reach steady state operating conditions. At steady state conditions, the active preregulator provides 170 volts DC output, however, during transient start-up conditions the output is substantially below that. When operating instant-start lamps, this results in the undesirable effect of an unacceptably "preheat" or glow period at low voltage. Instant-start lamps are typically specified to be operated at low initial voltage for no more than 50 milliseconds, because longer "preheat" periods undesirably shorten lamp life due to excessive electrode erosion during such low-voltage "preheat" conditions. This is in addition to undesirable visible phenomena during starting.

The present invention overcomes these difficulties by delaying startup of the power converter section of the ballast until the preregulator section has stabilized, thus providing "instant" starting with electronic ballasts.

DETAILED DESCRIPTION

Figure 1:
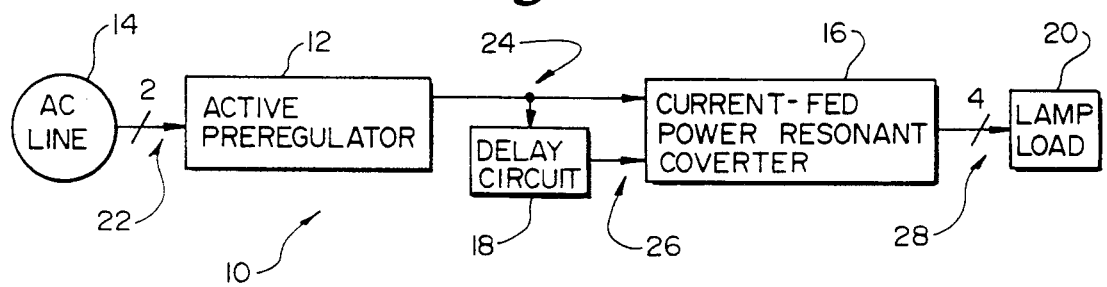
FIG. 1 is a simplified block diagram of the electronic ballast of the present invention.

Referring now to FIG. 1, the electronic ballast or a system 10 has an active preregulator 12 operating from the conventional alternating current (AC) power supply 14 connected through leads 22. Preregulator 12 provides DC power on lead or path 24 to a current-fed power resonant converter 16. A delay circuit 18 preferably operates from the DC bus 24 and provides a signal on lead or path 26 to converter 16 which prevents converter 16 from applying power to a lamp load 20 via lines 28 until the output of preregulator 12 on line 24 has stabilized to a substantially steady state value.

Figure 2:
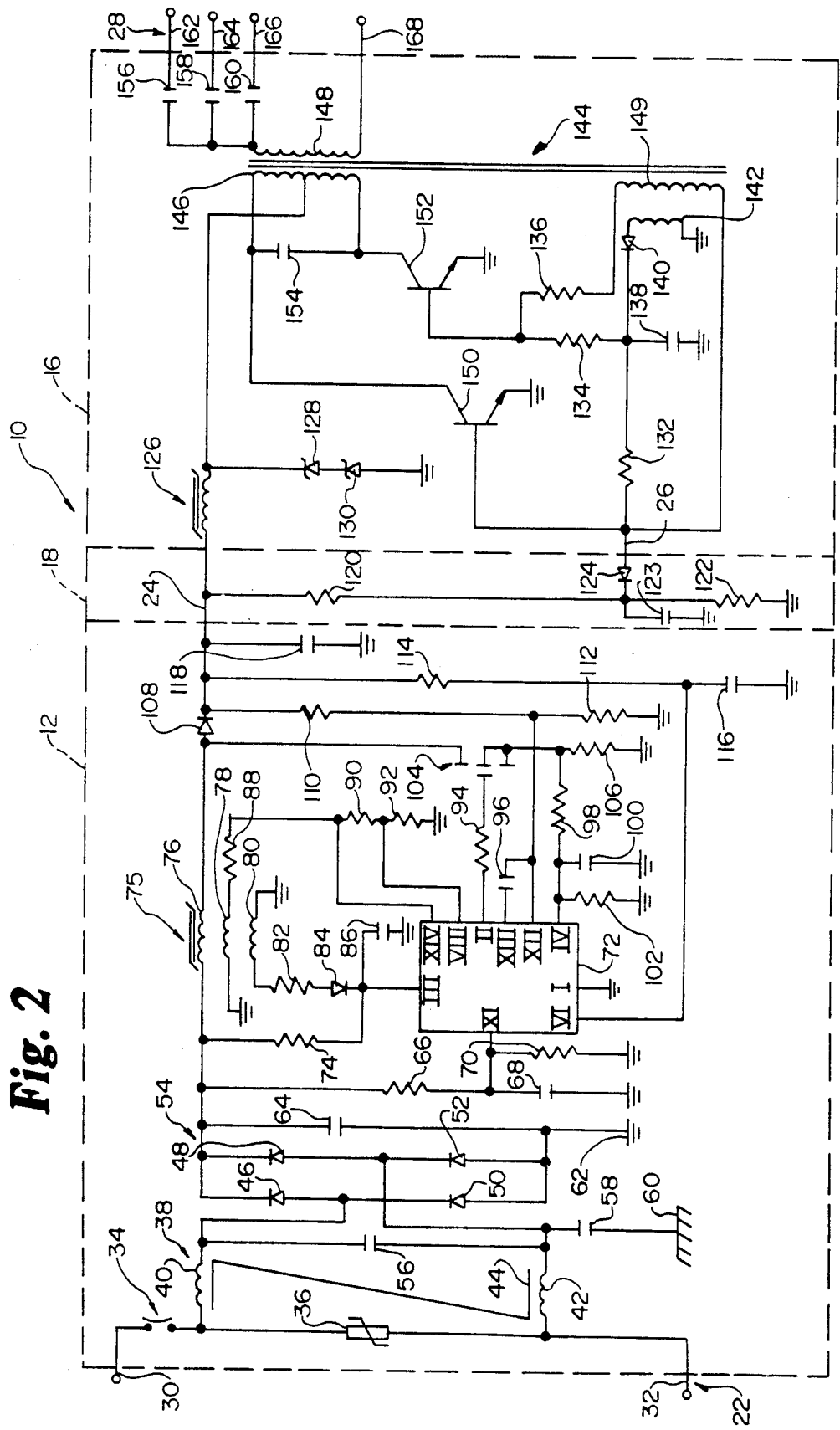
FIG. 2 is a detailed electrical schematic of an electronic ballast embodying the present invention.

Referring now also to FIG. 2, details of the preregulator, converter, and delay circuits may be seen. Preregulator 12 is preferably a boost-type circuit. Input lines 22 to preregulator 12 include first and second leads 30, 32 which are to be understood to be preferably connectable to a conventional 60-cycle AC power supply 14. A conventional thermal protector 34 is preferably connected in series with lead 30, and a conventional metal oxide varistor surge suppressor 36 is preferably connected across an input to an inductor 38 having a first winding 40 of 200 mh and a second winding 42 of 200 mh wound on a common core 44. A diode bridge 54 is preferably formed of four 1N4007-type diodes 46, 48, 50, 52. A 0.47 mh capacitor 56 is preferably connected across the input to bridge 54. A 3.3 nf capacitor 58 is preferably connected from one side of the bridge input to chassis ground 60. It is to be understood that circuit common is indicated in FIG. 2 by symbol 62. A 1 mf capacitor 64 is preferably connected across the output of bridge 54, between node 55 and circuit common 62. A 2.2M ohm resistor 66 and a 0.01 mf capacitor 68 form a low-pass filter shunted by a 16.2K ohm resistor 70. A type 4814 integrated circuit active power controller 72 such as is available from Siemens Corporation may be used to operate preregulator 12. It is to be understood that the roman numerals shown in controller 72 indicate pin numbers for the integrated circuit or IC. IC 72 operates preregulator 12 to provide a controlled DC output voltage at lead 24 and at the same time presents a high power factor load at input 22, as seen by AC line 14. A 120K ohm resistor 74 provides startup power for chip 72. A series inductor 75, along with active switching device 104, diode 108 and capacitor 118 make up a traditional boost topology. Inductor 75 has a 450 mh primary winding 76, and a 24 mh auxiliary winding 78 connected through a 22K ohm resistor 88, a current sense resistor 90 of 160K ohms, and a 2K ohm resistor 92. Inductor 75 also has a 9.5 mh winding 80 to provide power to IC or chip 72 through a 220 ohm resistor 82 and diode 84. A 47 mh capacitor 86 provides filtering on the power supply input pin III of chip 72. The output of chip 72 on pin II is provided through a 22 ohm resistor 94 to a type IRF 730 FET 104 (available from International Rectifier Corporation) which is connected to circuit common 62 through a 0.24 ohm resistor 106. FET current is sensed by resistor 106 and supplied to pin IV of chip 72 through a 330 ohm resistor 98, filtered by a 1 nf capacitor 100 and scaled by a 1K ohm resistor 102. A voltage divider is made up of a 1M ohm resistor 110 and a 9.1K ohm resistor 112 is supplied to pin VII directly and through a 0.22 mf capacitor 96 to a compensation input pin VIII on IC 72. The voltage on line 24 is filtered by a 82 mf capacitor 118.

Delay circuit 18 includes a 220K ohm resistor 120, a 22K ohm resistor 122, a 0.1 mf capacitor 123 and a 20 volt zener diode 124.

Converter 16 includes a 6 mh inductor 126, a pair of 200 volt zener diodes 128, 130. A biasing and filtering network is made up of a pair of 510 ohm resistors 132, 134, a 1.5 ohm resistor 136, and a 4.7 mf capacitor 138. A 1N4933 diode 140 receives the feedback signal from a 2 turn winding 142 on an output transformer 144. Transformer 144 has a primary winding 146 which is center-tapped and made up of 116 turns. A principal secondary winding 148 is preferably 135 turns. A pair of 1200 v, 2.5 amp switching transistors 150, 152 form a push-pull circuit at primary 146, with a 4.3 nf capacitor 154 connected across primary 146. Three 2.3 nf capacitors 156, 158, 160 couple electrical power from secondary 148 to output leads 162, 164, 166 respectively. Lead 168 completes the output terminals 28 which are adapted for connection to a lamp load 20.

The operation of ballast 10 is as follows. Upon application of voltage to input leads 30, 32, a rectified sine wave voltage will appear between circuit common 62 and node 55. Bridge 54 provides full-wave rectification of the input power. Inductor 38 acts as a common-mode choke, and, together with capacitors 56, 58 and 64, provide filtering to the power input.

Preregulator 12 is an active power factor correction preregulator utilizing a boost topology power control element driven by IC 72 to provide power factor correction. IC 72 forces the average of the current in inductor 75 to follow the sinoicidal line voltage. It is to be understood that the current in inductor 75 is made up of a series of triangular current pulses of a frequency substantially higher than the input frequency.

Preregulator 12 further includes a boost-type winding 76 of inductor 75, transistor switch 104, diode 108 and filter capacitor 118. Resistors 66, 70 provide IC 72 with input line voltage sensing at pin XI. Resistors 110, 112 provide IC 72 with DC output voltage sensing to pin XII. Transistor switch 104 is driven by IC 72. Once IC 72 has started operation, winding 80 of inductor 75 provides power to IC 72 through limit resistor 82 and diode 84. In addition, winding 78 of inductor 75 provides zero crossing detection to IC 72 via resistors 88, 90, 92 to pin XIV. Resistor 114, capacitor 116 and the internal trigger device in IC 72 at pin VI deliver the detection signal during the start-up period through pin VIII and resistors 90 and 92.

Due to the inherent time delay caused by the low pass filter characteristic of resistor 74 and capacitor 86 during start-up, along with "under 10 volt lockout" feature of IC 72, preregulator 12 will not attain an output steady-state voltage of 230 volts until after approximately 100 to 500 milliseconds have elapsed. During this time, a voltage of approximately 170 volts DC has been observed on node 24, because of diode 108 supplying capacitor 118. This 170 volts DC is not enough to provide proper starting for instant-start lamps in lamp load 20.

Delay circuit 18 prevents biasing of transistors 150, 152 until a steady state voltage has substantially achieved 230 volts DC at DC buss 24 or until approximately 500 milliseconds has elapsed.

Resistor 94 limits the peak current into the gate of transistor 104. Resistor 106 provides current sensing for IC 72. Resistors 98, 102 and capacitor 100 provide scaling and filtering of the current signal presented to pin IV of IC 72.

Converter 16 has a constant current choke 126, and a parallel resonant tank circuit made up of capacitor 154 and winding 146 of transformer 148, along with transistor switches 150, 152. Winding 149 of transformer 144 provides a feedback voltage for steering the ON/OFF action of transistors 150, 152. Winding 142 of transformer 144 along with diode 140, capacitor 138 and resistors 134, 136 provide the necessary base drive for transistors 150, 152. Zener diodes 128, 130 provide over-voltage protection for transistors 150, 152. Winding 148 of transformer 144 provides a voltage increase for the lamp load 20. Capacitors 156, 158 and 160 limit the current to lamp load 20.

Figure 3:
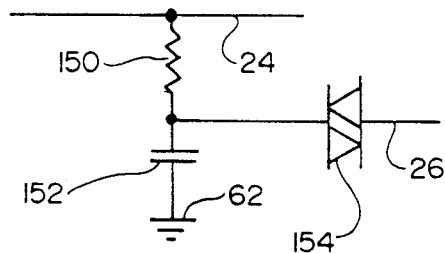
FIG. 3 is an alternative delay circuit utilizing a resistor and a diac.

The invention is not to be taken as limited to all of the details thereof as modifications and variations thereof may be made without departing from the spirit or scope of the invention. For example and now referring to FIG. 3, the delay circuit 18 may be made up of a resistor 150, a capacitor 152 and a diac 154 in an alternative embodiment.

Figure 4:
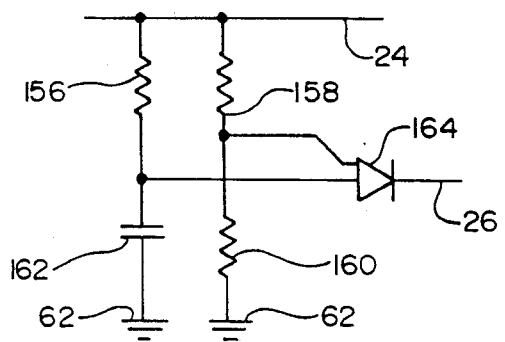
FIG. 4 is an alternative embodiment of the delay circuit of the present invention utilizing a programmable unijunction transistor.

In a still further embodiment, circuit 18 may be made up of resistors 156, 158, 160, a capacitor 162 and a programmable unijunction transistor 164, as shown in FIG. 4. Other variations within the spirit and scope of the invention will be apparent to those of skill in the art.

What is claimed is:

1. In an electronic ballast of the type having an electronic converter powered by an active electronic preregulator that takes a predetermined start-up time to reach steady state operating conditions, the improvement in combination therewith comprising delay means connected between the preregulator and the converter for delaying the start-up of the converter for a predetermined delay time after electrical power is supplied to the ballast, the delay time being longer than the start-up time.

2. The improved electronic ballast of claim 1 wherein the preregulator comprises a boost circuit.

3. The improved electronic ballast of claim 1 wherein the converter comprises a current-fed power-resonant circuit.

4. The improved electronic ballast of claim 1 wherein the converter comprises an inductive-capacitive parallel-resonant, push-pull circuit.

5. The improved electronic ballast of claim 4 wherein the delay means comprises a resistor and zener diode network connected between the preregulator output and an oscillation-enabling input of the converter.

6. The improved electronic ballast of claim 4 wherein the delay means comprises a resistor, capacitor and diac network connected between the preregulator output and an oscillation-enabling input of the converter.

7. The improved electronic ballast of claim 4 wherein the delay means comprises a programmable unijunction transistor circuit connected between the preregulator output and an oscillation-enabling input of the converter.

8. A method of starting an electronic ballast of the type having an active electronic preregulator that takes a predetermined start-up time to reach steady state operating condition supplying power to a self-resonant electronic converter, the method comprising the steps of applying power to a power input of the preregulator; and delaying oscillation of the electronic converter for a period longer than the start-up time, such that the preregulator achieves substantially steady-state output.

* * * * *